United States Patent
Xu et al.

(10) Patent No.: US 12,391,574 B2
(45) Date of Patent: Aug. 19, 2025

(54) METHOD FOR CONTINUOUSLY PREPARING MIXED HYDROXIDE PRECIPITATE FROM LATERITE NICKEL ORE BY HYDROMETALLURGY

(71) Applicants: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

(72) Inventors: Kaihua Xu, Shenzhen (CN); Satryo Soemantri Brodjonegoro, Jakarta (ID); Tegar Mukti Aji, Jakarta (ID); Rizky Wanaldi, Jakarta (ID); Andi Syaputra Hasibuan, Jakarta (ID); Evan Wahyu Kristiyanto, Jakarta (ID); Emil Salim, Jakarta (ID); Tao Cui, Jakarta (ID)

(73) Assignees: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

( * ) Notice: Subject to any disclaimer, the term of this patent is extended or adjusted under 35 U.S.C. 154(b) by 0 days.

(21) Appl. No.: 18/869,930

(22) PCT Filed: Jun. 30, 2023

(86) PCT No.: PCT/CN2023/105023
§ 371 (c)(1),
(2) Date: Nov. 27, 2024

(87) PCT Pub. No.: WO2025/000492
PCT Pub. Date: Jan. 2, 2025

(65) Prior Publication Data
US 2025/0178922 A1    Jun. 5, 2025

(51) Int. Cl.
C01G 53/05    (2025.01)
C22B 3/00    (2006.01)
C22B 3/44    (2006.01)

(52) U.S. Cl.
CPC ............... *C01G 53/05* (2025.01); *C22B 3/44* (2013.01); *C22B 23/0461* (2013.01); *C01P 2004/52* (2013.01)

(58) Field of Classification Search
CPC ....... C01G 53/05; C22B 3/44; C22B 23/0461; C01P 2004/52

(Continued)

(56) References Cited

FOREIGN PATENT DOCUMENTS

| CN | 107400788 A | 11/2017 | |
|---|---|---|---|
| EP | 3816308 A1 * | 5/2021 | ............. C01G 45/02 |
| WO | WO-0248042 A1 * | 6/2002 | ............. C01G 53/04 |

OTHER PUBLICATIONS

English translation of CN 107400788 A. (Year: 2017).*

(Continued)

*Primary Examiner* — Anthony J Zimmer
*Assistant Examiner* — Zachary John Baum
(74) *Attorney, Agent, or Firm* — Hemisphere Law, PLLC; Zhigang Ma

(57) ABSTRACT

Disclosed is a method for continuously preparing mixed hydroxide precipitate from a laterite nickel ore by hydrometallurgy. Primary-precipitated mixed hydroxide precipitate particles are used as crystal nuclei, by controlling precipitation process conditions, the quantity of the crystal nuclei, and reaction time of the crystal nuclei, primary mixed hydroxide precipitate crystal nuclei gradually grow, and crystal forms become larger. By controlling the number of cycles, a proportion of returned seed crystals, and a homogenization ratio with precipitants, mixed hydroxide precipitate particles with narrow particle size distribution, (Continued)

dense particles, and better sedimentation effect are obtained, thereby reducing a moisture content of mixed hydroxide precipitate. The preparation method in this disclosure plays a certain guiding role in practical production and has good application prospects.

12 Claims, 1 Drawing Sheet

(58) Field of Classification Search
USPC .................................................. 423/594.3
See application file for complete search history.

(56) References Cited

OTHER PUBLICATIONS

Cohen, E., et al. (2007). Quantities, Units and Symbols in Physical Chemistry (3rd Edition)—1.3.2 General Rules for Symbols for Units. (pp. 6). Royal Society of Chemistry (RSC). Retrieved from https://app.knovel.com/hotlink/pdf/id:kt007QVD71/quantities-units-symbols/general-rules-symbols. (Year: 2007).*
Clams of PCT PCT/CN2023/105023, Jun. 30, 2023.
CNIPA (ISA), Written opinion for PCT/CN2023/105023, Dec. 21, 2023.

* cited by examiner

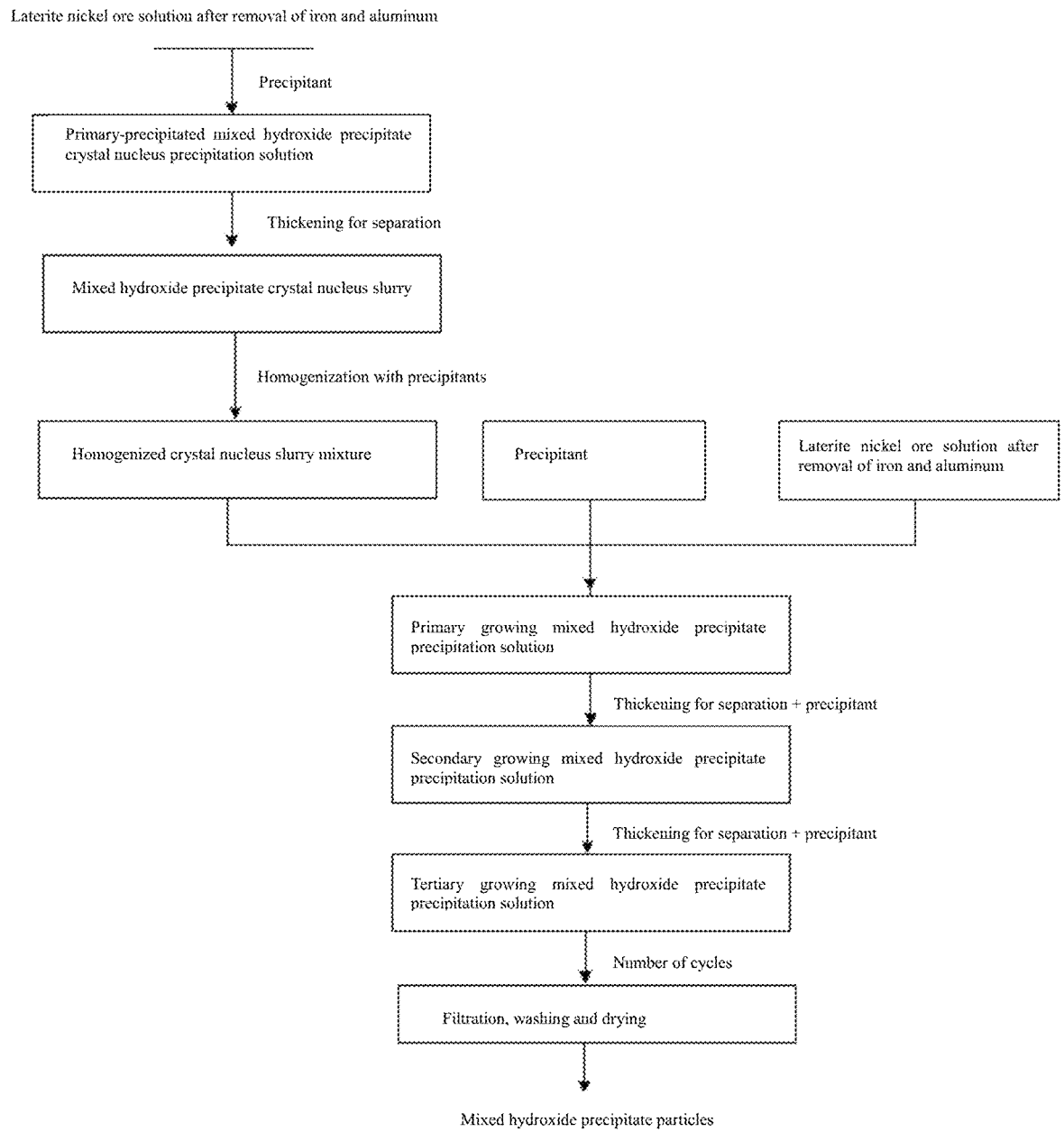

METHOD FOR CONTINUOUSLY PREPARING MIXED HYDROXIDE PRECIPITATE FROM LATERITE NICKEL ORE BY HYDROMETALLURGY

FIELD OF THE DISCLOSURE

This disclosure belongs to the field of hydrometallurgy of a laterite nickel ore, and particularly relates to a method for continuously preparing mixed hydroxide precipitate from a laterite nickel ore by hydrometallurgy.

BACKGROUND

Mixed hydroxide precipitate (MHP) is grayish green powder wholly, which is an intermediate product of nickel, prepared from a laterite nickel ore through a high-pressure acid leaching technology (HPAL). The mixed hydroxide precipitate can be used for producing products such as nickel sulfate, refined mixed hydroxide precipitate, and nickel plates, especially the nickel sulfate which is one of main materials for positive electrodes of ternary batteries. In recent years, with continuous development of industries such as electric vehicles, the market capacity of the ternary batteries has continued to expand, which also increases market demands for the mixed hydroxide precipitate.

A main production process of the mixed hydroxide precipitate is a hydrometallurgy process-a high-pressure acid leaching technology. After acid leaching is performed on the laterite nickel ore, a precipitant is added to an acid leaching solution to precipitate nickel and cobalt so as to form a nickel-cobalt precipitation solution; and then the nickel-cobalt precipitation solution is thickened to obtain mixed hydroxide precipitate. In the course of preparing the mixed hydroxide precipitate in the prior art, there are several problems: (1) prepared mixed hydroxide precipitate particles have wide particle size distribution and an agglomeration phenomenon; and (2) the mixed hydroxide precipitate has a high moisture content, which is not conducive to subsequent processing. If the above problems can be solved, it will inevitably promote processing of nickel ore and provide a good development opportunity for the mixed hydroxide precipitate industry.

SUMMARY

In order to overcome the shortcomings of the prior art, this disclosure provides a method for continuously preparing mixed hydroxide precipitate from a laterite nickel ore by hydrometallurgy.

The objective of this disclosure is achieved by the following technical solution.

The method for continuously preparing mixed hydroxide precipitate from a laterite nickel ore by hydrometallurgy includes the following steps:

(1) firstly, taking a laterite nickel ore solution after removal of iron and aluminum, adding a precipitant for a precipitation reaction to form a primary-precipitated mixed hydroxide precipitate crystal nucleus precipitation solution, and then performing thickening to obtain a mixed hydroxide precipitate crystal nucleus slurry;

(2) adding the precipitant to the mixed hydroxide precipitate crystal nucleus slurry for homogenization to obtain a homogenized crystal nucleus slurry mixture, and simultaneously adding the homogenized crystal nucleus slurry mixture, the precipitant, and the laterite nickel ore solution after removal of iron and aluminum into a reactor for a reaction to obtain a primary growing mixed hydroxide precipitate precipitation solution;

(3) thickening the primary growing mixed hydroxide precipitate precipitation solution, and then adding the precipitant for a precipitation reaction to obtain a secondary growing mixed hydroxide precipitate precipitation solution; and (4) thickening the secondary growing mixed hydroxide precipitate precipitation solution, then adding the precipitant for a precipitation reaction to obtain a tertiary growing mixed hydroxide precipitate precipitation solution, performing such cycle several times to obtain a final mixed hydroxide precipitate precipitation solution, and performing filtration, washing and drying to obtain mixed hydroxide precipitate particles.

Preferably, sources of the laterite nickel ore solution after removal of iron and aluminum in Step (1) and Step (2) are solutions obtained through high-pressure acid leaching of the laterite nickel ore and removal of iron and aluminum.

Preferably, for the precipitant in Step (1), a molar mass required for hydroxyls is calculated according to 70-120% of a nickel-cobalt precipitation rate.

Preferably, conditions for the precipitation reaction in Step (1) are: temperature of 40-70° C. and time of 30 min-12 h.

Preferably, the precipitants in Steps (1)-(4) are at least one of sodium hydroxide, lime milk, potassium hydroxide, calcium oxide, magnesium oxide, and magnesium hydroxide.

Preferably, the sodium hydroxide is blended to obtain a solution with a concentration of 4-25 wt % during use, and a concentration of the lime milk is 5-30 wt %.

Preferably, the mixed hydroxide precipitate crystal nucleus slurry in Step (2) is homogenized in a mass ratio of the amount of the mixed hydroxide precipitate crystal nucleus slurry to a theoretical precipitation quantity being (6-10):1.

Preferably, a mass ratio of the homogenized crystal nucleus slurry mixture, to the precipitant, to the laterite nickel ore solution after removal of iron and aluminum in Step (2) is (1-8):(1-4):100.

Preferably, conditions for the reaction in Step (2) are: temperature of 40-70° C. and time of 1 min-4 h.

Preferably, a mass ratio of a slurry obtained by thickening in Step (3) and Step (4) to the precipitant is (1-10):1.

Preferably, conditions for the precipitation reactions in steps (3) and Step (4) are: temperature of 40-70° C. and time of 30 min-12 h.

Preferably, the number of cycles in Step (4) is 1-20.

Preferably, filtration in Step (4) is performed through any one of a centrifuge, a vertical filter press and a horizontal filter press.

Preferably, a washing manner in Step (4) is: during filtration, a filter cake is rinsed with pure water or pure water is added for dilution and washing.

The mechanism or principle involved in this disclosure is that the crystal nucleus slurry is seed crystals, and the precipitant and an aluminum removal solution are subjected to the precipitation reaction to continue growing on the crystal nuclei.

Compared with the prior art, this disclosure has the following beneficial effects:

(1) in this disclosure, primary-precipitated mixed hydroxide precipitate crystal particles are used as crystal nuclei, and through the precipitation reaction repeated several time, the crystal nuclei continuously grow; and by controlling the number of cycles, a proportion of returned seed crystals, and a homogenization ratio with precipitants, mixed hydroxide precipitate particles with narrow particle size distribution, dense particles, and better sedimentation effect are obtained, thereby reducing a moisture content of the mixed hydroxide precipitate.

(2) In this disclosure, the growth rate, crystal morphology, particle size, and particle size distribution of the crystal nuclei are controlled by controlling the quantity of the primary mixed hydroxide precipitate crystal nuclei, the quantity of the precipitant, the growth time of the crystal nuclei, the stirring speed of the reactor, and a feeding manner.

BRIEF DESCRIPTION OF THE DRAWINGS

FIG. 1 is a schematic flow of a method for continuously preparing mixed hydroxide precipitate from a laterite nickel ore by hydrometallurgy according to this disclosure.

DETAILED DESCRIPTION OF PREFERRED EMBODIMENTS

In order to make the objectives and advantages of this disclosure clearer and more comprehensible, this disclosure is described in further detail below with reference to the embodiments. It should be understood that the specific embodiments described herein are merely illustrative of this disclosure and are not intended to limit this disclosure.

The source of the laterite nickel ore solution after removal of iron and aluminum used in the embodiments and comparative embodiments is a solution obtained through high-pressure acid leaching of the laterite nickel ore and removal of iron and aluminum. Cationic components are as follows: nickel ions of 3.2 g/L, cobalt ions of 0.3 g/L, manganese ions of 2.4 g/L, and magnesium ions of 3.8 g/L.

Embodiment 1

A method for continuously preparing mixed hydroxide precipitate from a laterite nickel ore by hydrometallurgy includes the following steps:

(1) firstly, 1 L of a laterite nickel ore solution after removal of iron and aluminum was taken, 21.6 g of a precipitant (sodium hydroxide with a concentration of 20 wt %) was added for a precipitation reaction (reaction temperature of 60° C., and time of 1 h) to form a primary-precipitated mixed hydroxide precipitate crystal nucleus precipitation solution, and then thickening for separation was performed to obtain a mixed hydroxide precipitate crystal nucleus slurry;

(2) 10.8 g of a precipitant (sodium hydroxide with a concentration of 20 wt %) was added to 30 g of the mixed hydroxide precipitate crystal nucleus slurry for homogenization (5 min) to obtain a homogenized crystal nucleus slurry mixture; and the homogenized crystal nucleus slurry mixture, the precipitant (sodium hydroxide with a concentration of 20 wt %), and the laterite nickel ore solution after removal of iron and aluminum were taken in a mass ratio of 4:1:100, and were simultaneously added into a reactor for a reaction (reaction temperature of 60° C., and time of 1 h) to obtain a primary growing mixed hydroxide precipitate precipitation solution;

(3) the primary growing mixed hydroxide precipitate precipitation solution was subjected to thickening for separation, and then the precipitant (sodium hydroxide with a concentration of 20 wt %, and a mass ratio of the precipitant to the slurry being 1:3) was added to the slurry obtained through separation for a precipitation reaction (reaction temperature of 60° C., and time of 1 h) to obtain a secondary growing mixed hydroxide precipitate precipitation solution; and (4) the secondary growing mixed hydroxide precipitate precipitation solution was subjected to thickening for separation, the precipitant (sodium hydroxide with a concentration of 20 wt %, and a mass ratio of the precipitant to the slurry being 1:4) was added to the slurry obtained through separation for a precipitation reaction (reaction temperature of 60° C., and time of 1 h) to obtain a tertiary growing mixed hydroxide precipitate precipitation solution, such cycle was performed 15 times (means that seed crystal growth in the mixed hydroxide precipitate precipitation solution repeats 15 times in total) to obtain a final mixed hydroxide precipitate precipitation solution, and filtration, washing and drying were performed to obtain mixed hydroxide precipitate particles.

After detection, the mixed hydroxide precipitate particles prepared in Embodiment 1 have: D10=1.962 μm, D50=6.915 μm, and D90=15.434 μm.

The final mixed hydroxide precipitate precipitation solution obtained in Embodiment 1 has a moisture content of 53.2% after being subjected to filter pressing by the filter press. After detection and calculation, the mixed hydroxide precipitate particles prepared in Embodiment 1 contain 39.5% of nickel and 3.3% of cobalt, with a nickel-cobalt precipitation rate of 88%.

Embodiment 2

A method for continuously preparing mixed hydroxide precipitate from a laterite nickel ore by hydrometallurgy includes the following steps:

the embodiment is different from Embodiment 1 only in that:

the reaction time in Steps 1-4 should be 2 h, and the number of cycles in Step 4 should be 20.

After detection, the mixed hydroxide precipitate particles prepared in Embodiment 2 have: D10=2.142 μm, D50=7.225 μm, and D90=15.736 μm.

The final mixed hydroxide precipitate precipitation solution obtained in Embodiment 2 has a moisture content of 51.8% after being subjected to filter pressing by the filter press.

After detection and calculation, the mixed hydroxide precipitate particles prepared in Embodiment 2 contain 39.8% of nickel and 3.32% of cobalt, with a nickel-cobalt precipitation rate of 90%.

Embodiment 3

A method for continuously preparing mixed hydroxide precipitate from a laterite nickel ore by hydrometallurgy includes the following steps:

the embodiment is different from Embodiment 1 only in that:

the reaction time in Steps 1-4 is 4 h, and the number of cycles in Step 4 is 10.

After detection, the mixed hydroxide precipitate particles prepared in Embodiment 3 have: D10=1.915 μm, D50=7.153 μm, and D90=15.582 μm.

The final mixed hydroxide precipitate precipitation solution obtained in Embodiment 3 has a moisture content of 52.8% after being subjected to filter pressing by the filter press.

After detection and calculation, the mixed hydroxide precipitate particles prepared in Embodiment 3 contain 39.6% of nickel and 3.28% of cobalt, with a nickel-cobalt precipitation rate of 89%.

Embodiment 4

A method for continuously preparing mixed hydroxide precipitate from a laterite nickel ore by hydrometallurgy includes the following steps:
the embodiment is different from Embodiment 1 only in that:
reaction temperature in Steps 1-4 is 70° C.

Embodiment 5

A method for continuously preparing mixed hydroxide precipitate from a laterite nickel ore by hydrometallurgy includes the following steps:
the embodiment is different from Embodiment 2 only in that:
reaction temperature in Steps 1-4 is 70° C.

Embodiment 6

A method for continuously preparing mixed hydroxide precipitate from a laterite nickel ore by hydrometallurgy includes the following steps:
the embodiment is different from Embodiment 3 only in that:
reaction temperature in Steps 1-4 is 70° C.

Comparative Embodiment 1

A method for preparing mixed hydroxide precipitate from a laterite nickel ore solution after removal of iron and aluminum includes the following steps:
the comparative embodiment is different from Embodiment 1 only in:
the number of cycles in Step 4 is 0.

After detection, the mixed hydroxide precipitate particles prepared in Comparative embodiment 1 have: D10=3.032 μm, D50=10.998 μm, and D90-33.216 μm.

The final mixed hydroxide precipitate precipitation solution obtained in Comparative embodiment 1 has a moisture content of 66.12% after being subjected to filter pressing by the filter press.

After detection and calculation, the mixed hydroxide precipitate particles prepared in Comparative embodiment 1 contain 34.77% of nickel and 2.7% of cobalt, with a nickel-cobalt precipitation rate of 80%.

Comparative Embodiment 2

A method for preparing mixed hydroxide precipitate from a laterite nickel ore solution after removal of iron and aluminum includes the following steps:
the comparative embodiment is different from Embodiment 1 only in that: the reaction time in Steps 1-4 is 2 h.

Comparative Embodiment 3

A method for preparing mixed hydroxide precipitate from a laterite nickel ore solution after removal of iron and aluminum includes the following steps:
The comparative embodiment is different from Embodiment 1 only in that: the reaction time in Steps 1-4 is 4 h.

Comparative Embodiment 4

A method for preparing mixed hydroxide precipitate from a laterite nickel ore solution after removal of iron and aluminum includes the following steps:
the comparative embodiment is different from Embodiment 1 only in that: the reaction temperature in Steps 1-4 is 70° C.

Comparative Embodiment 5

A method for preparing mixed hydroxide precipitate from a laterite nickel ore solution after removal of iron and aluminum includes the following steps:
the comparative embodiment is different from Embodiment 2 only in that: the reaction temperature in Steps 1-4 is 70° C.

Comparative Embodiment 6

A method for preparing mixed hydroxide precipitate from a laterite nickel ore solution after removal of iron and aluminum includes the following steps:
the comparative embodiment is different from Embodiment 3 only in that: the reaction temperature in Steps 1-4 is 70° C.

The comparative statistical table of the performance of the products in Embodiments 1-6 and Comparative Embodiments 1-6 is shown in Table 1.

TABLE 1

Comparative statistical table of performance

| Sample | Temperature/° C. | Reaction time/h | Number of cycles | Particle size distribution | Moisture content/% | Nickel content/% | Cobalt content/% |
|---|---|---|---|---|---|---|---|
| Embodiment 1 | 60 | 1 | 15 | D10 = 1.962 μm, D50 = 6.915 μm, D90 = 15.434 μm | 53.2 | 39.5 | 3.3 |
| Embodiment 2 | 60 | 2 | 20 | D10 = 2.142 μm, D50 = 7.225 μm, D90 = 15.736 μm | 51.8 | 39.8 | 3.32 |
| Embodiment 3 | 60 | 4 | 10 | D10 = 1.915 μm, D50 = 7.153 μm, D90 = 15.582 μm | 52.8 | 39.6 | 3.28 |
| Embodiment 4 | 70 | 1 | 15 | D10 = 2.253 μm, D50 = 7.105 μm, D90 = 16.05 μm | 52.3 | 39.72 | 3.31 |

TABLE 1-continued

Comparative statistical table of performance

| Sample | Temperature/ °C. | Reaction time/h | Number of cycles | Particle size distribution | Moisture content/ % | Nickel content/ % | Cobalt content/ % |
|---|---|---|---|---|---|---|---|
| Embodiment 5 | 70 | 2 | 20 | D10 = 2.342 μm, D50 = 7.325 μm, D90 = 15.936 μm | 51.2 | 40.1 | 3.33 |
| Embodiment 6 | 70 | 4 | 10 | D10 = 2.015 μm, D50 = 7.031 μm, D90 = 15.782 μm | 52.5 | 39.7 | 3.31 |
| Comparative embodiment 1 | 60 | 1 | 0 | D10 = 3.032 μm, D50 = 10.998 μm, D90 = 33.216 μm | 66.12 | 34.77 | 2.7 |
| Comparative embodiment 2 | 60 | 2 | 0 | D10 = 2.944 μm, D50 = 10.644 μm, D90 = 31.115 μm | 65.34 | 34.83 | 2.72 |
| Comparative embodiment 3 | 60 | 4 | 0 | D10 = 2.869 μm, D50 = 10.501 μm, D90 = 29.244 μm | 65.2 | 35.09 | 2.74 |
| Comparative embodiment 4 | 70 | 1 | 0 | D10 = 2.752 μm, D50 = 10.094 μm, D90 = 28.996 μm | 64.18 | 35.71 | 2.81 |
| Comparative embodiment 5 | 70 | 2 | 0 | D10 = 2.696 μm, D50 = 9.767 μm, D90 = 27.234 μm | 63.63 | 36.2 | 2.85 |
| Comparative embodiment 6 | 70 | 4 | 0 | D10 = 2.673 μm, D50 = 9.464 μm, D90 = 26.278 μm | 63.2 | 36.77 | 2.89 |

By comparing Embodiments 1-6, it can be seen that the crystal nuclei continuously grow after the precipitation reaction repeated several times, and by controlling the number of cycles, mixed hydroxide precipitate particles with narrow particle size distribution, dense particles, and better sedimentation effect are obtained, thereby reducing the moisture content of MHP.

The growth rate, crystal morphology, particle size, and particle size distribution of crystal nuclei are controlled by controlling the quantity of the primary mixed hydroxide precipitate crystal nuclei, the quantity of the precipitants, the growth time of the crystal nuclei, the stirring speed of the reactor, and a feeding manner.

The foregoing descriptions are implementation manners of this disclosure, but are not intended to limit the protection scope of this disclosure. Any changes and modifications made according to the technical idea of this disclosure shall fall within the protection scope of the claims of this disclosure.

What is claimed is:

1. A method for continuously preparing mixed hydroxide precipitate from a laterite nickel ore by hydrometallurgy, comprising the following steps:
   (1) firstly, taking a laterite nickel ore solution after removal of iron and aluminum, adding a precipitant for a precipitation reaction to form a primary-precipitated mixed hydroxide precipitate crystal nucleus precipitation solution, and then performing thickening to obtain a mixed hydroxide precipitate crystal nucleus slurry;
   (2) adding the precipitant to the mixed hydroxide precipitate crystal nucleus slurry for homogenization to obtain a homogenized crystal nucleus slurry mixture, and simultaneously adding the homogenized crystal nucleus slurry mixture, the precipitant, and the laterite nickel ore solution after removal of iron and aluminum into a reactor for a reaction to obtain a primary growing mixed hydroxide precipitate precipitation solution;
   (3) thickening the primary growing mixed hydroxide precipitate precipitation solution, and then adding the precipitant for a precipitation reaction to obtain a secondary growing mixed hydroxide precipitate precipitation solution; and
   (4) thickening the secondary growing mixed hydroxide precipitate precipitation solution, then adding the precipitant for a precipitation reaction to obtain a tertiary growing mixed hydroxide precipitate precipitation solution, taking obtaining one time of growing mixed hydroxide precipitate precipitation solution as a cycle and performing such cycle one or more times to obtain a final mixed hydroxide precipitate precipitation solution, and performing filtration, washing and drying to obtain mixed hydroxide precipitate particles;
   wherein, a mass ratio of the homogenized crystal nucleus slurry mixture, to the precipitant, to the laterite nickel ore solution after removal of iron and aluminum in Step (2) is (1-8):(1-4):100.

2. The method for continuously preparing mixed hydroxide precipitate from a laterite nickel ore by hydrometallurgy according to claim 1, wherein the mixed hydroxide precipitate crystal nucleus slurry in Step (2) is homogenized in a mass ratio of the amount of the mixed hydroxide precipitate crystal nucleus slurry to a theoretical precipitation quantity being (6-10):1.

3. The method for continuously preparing mixed hydroxide precipitate from a laterite nickel ore by hydrometallurgy according to claim 2, wherein a mass ratio of a slurry obtained by the thickening in Step (3) and Step (4) to the precipitant is (1-10):1.

4. The method for continuously preparing mixed hydroxide precipitate from a laterite nickel ore by hydrometallurgy according to claim 1, wherein sources of the laterite nickel ore solution after removal of iron and aluminum in Step (1) and Step (2) are a solution obtained through high-pressure acid leaching of the laterite nickel ore and then removal of iron and aluminum.

5. The method for continuously preparing mixed hydroxide precipitate from a laterite nickel ore by hydrometallurgy according to claim 4, wherein the precipitants in Steps (1)-(4) are at least one of sodium hydroxide, lime milk, potassium hydroxide, calcium oxide, magnesium oxide, and magnesium hydroxide.

6. The method for continuously preparing mixed hydroxide precipitate from a laterite nickel ore by hydrometallurgy according to claim 5, wherein the sodium hydroxide is blended to obtain a solution with a concentration of 4-25 wt % during use, and a concentration of the lime milk is 5-30 wt %.

7. The method for continuously preparing mixed hydroxide precipitate from a laterite nickel ore by hydrometallurgy according to claim 1, wherein conditions for the precipitation reaction in Step (1) are: temperature of 40-70° C. and time of 30 min-12 h.

8. The method for continuously preparing mixed hydroxide precipitate from a laterite nickel ore by hydrometallurgy according to claim 7, wherein conditions for the reaction in Step (2) are: temperature of 40-70° C. and time of 1 min to 4 h.

9. The method for continuously preparing mixed hydroxide precipitate from a laterite nickel ore by hydrometallurgy according to claim 8, wherein conditions for the precipitation reactions in Step (3) and Step (4) are: temperature of 40-70° C. and time of 30 min-12 h.

10. The method for continuously preparing mixed hydroxide precipitate from a laterite nickel ore by hydrometallurgy according to claim 1, wherein the number of cycles in Step (4) is 1-20.

11. The method for continuously preparing mixed hydroxide precipitate from a laterite nickel ore by hydrometallurgy according to claim 1, wherein filtration in Step (4) is performed through any one of a centrifuge, a vertical filter press and a horizontal filter press.

12. The method for continuously preparing mixed hydroxide precipitate from a laterite nickel ore by hydrometallurgy according to claim 1, wherein a washing manner in Step (4) is: during filtration, a filter cake is rinsed with water or water is added for dilution and washing.

* * * * *